US012050121B2

(12) United States Patent
Käfer et al.

(10) Patent No.: US 12,050,121 B2
(45) Date of Patent: Jul. 30, 2024

(54) DEVICE FOR INDICATING A FLUID LEVEL

(71) Applicant: HYDAC ACCESSORIES GMBH, Sulzbach/Saar (DE)

(72) Inventors: Jürgen Käfer, Schiffweiler (DE); Markus Hanus, St. Ingbert (DE); Martin Schmitt, Knopp-Labach (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 448 days.

(21) Appl. No.: 17/424,571

(22) PCT Filed: Jan. 21, 2020

(86) PCT No.: PCT/EP2020/051342
§ 371 (c)(1),
(2) Date: Jul. 21, 2021

(87) PCT Pub. No.: WO2020/169289
PCT Pub. Date: Aug. 27, 2020

(65) Prior Publication Data
US 2022/0074778 A1 Mar. 10, 2022

(30) Foreign Application Priority Data
Feb. 23, 2019 (DE) ...................... 10 2019 001 310.7

(51) Int. Cl.
*G01F 23/02* (2006.01)
(52) U.S. Cl.
CPC .................... *G01F 23/02* (2013.01)

(58) Field of Classification Search
CPC ....................................................... G01F 23/02
See application file for complete search history.

(56) References Cited

U.S. PATENT DOCUMENTS 2,871,700 A 2/1959 Hilkene
4,494,730 A * 1/1985 George ................. F16K 27/062
251/309

(Continued)

FOREIGN PATENT DOCUMENTS

DE 78 21 350 11/1978
DE 10 2005 018 897 10/2006
EP 3 333 554 6/2018

OTHER PUBLICATIONS

International Search Report (ISR) issued Apr. 24, 2020 in International (PCT) Application No. PCT/EP2020/051342.

(Continued)

*Primary Examiner* — Eric S. McCall
(74) *Attorney, Agent, or Firm* — Wenderoth, Lind & Ponack, L.L.P.

(57) ABSTRACT

A device for indicating a fluid level has a device housing (2) with a viewing window (4) providing a view of a transparent indicator body (6), which can be at least partially filled with the fluid via at least one port piece (24). A cavity (26) of the port piece (24) is reached through by a securing part (14), which has a fluid guide (22) and which can secure the device housing (2) to a third component, such as a fluid storage tank. The port piece (24) includes a support structure having individual ribs (34, 36) interconnecting plate-shaped wall parts (30, 32) of the port piece (24). The support structure encompasses the cavity (26).

14 Claims, 4 Drawing Sheets

(56) References Cited

U.S. PATENT DOCUMENTS

| | | | | |
|---|---|---|---|---|
| 5,570,842 | A * | 11/1996 | Kindley | F02M 51/0653 |
| | | | | 239/585.5 |
| 10,151,614 | B2 * | 12/2018 | Krause | G01F 23/02 |
| 2002/0014118 | A1 * | 2/2002 | Wech | G01F 23/02 |
| | | | | 73/323 |
| 2004/0083809 | A1 * | 5/2004 | Wech | G01F 23/02 |
| | | | | 73/323 |
| 2007/0158056 | A1 | 7/2007 | Dickinson et al. | |
| 2008/0098810 | A1 * | 5/2008 | Skinner | G01F 23/2963 |
| | | | | 73/323 |
| 2008/0293861 | A1 * | 11/2008 | Wang | B29C 48/40 |
| | | | | 524/502 |
| 2015/0114109 | A1 * | 4/2015 | Wech | G01F 23/02 |
| | | | | 73/323 |
| 2016/0305810 | A1 | 10/2016 | Fitch et al. | |
| 2016/0356636 | A1 * | 12/2016 | Wilson | G01F 23/02 |
| 2016/0377472 | A1 * | 12/2016 | Wech | G01F 23/02 |
| | | | | 73/326 |
| 2019/0167969 | A1 * | 6/2019 | Yeh | A61M 39/20 |
| 2019/0170557 | A1 * | 6/2019 | Cui | G01F 23/162 |
| 2019/0195672 | A1 * | 6/2019 | Boldt | F16J 15/004 |
| 2019/0356081 | A1 * | 11/2019 | Fair | H01R 13/5205 |
| 2019/0390015 | A1 * | 12/2019 | Jeol | C08J 9/009 |
| 2020/0056920 | A1 | 2/2020 | Fitch et al. | |
| 2020/0056921 | A1 | 2/2020 | Fitch et al. | |
| 2020/0069933 | A1 * | 3/2020 | Park | A61M 39/12 |
| 2020/0141519 | A1 * | 5/2020 | Su | F04B 53/16 |
| 2021/0239499 | A1 * | 8/2021 | Käfer | G01F 23/02 |

OTHER PUBLICATIONS

German Office Action issued Jan. 20, 2020 in corresponding German Patent Application No. 10 2019 001 310.7, together with English machine translation thereof.

Grünbeck Wasseraufbereitungs GmbH: In: Grünbeck Wasseraufbereitungs GmbH. 89420 Höchstädt: Betriebsanleitung Rückspülfilter BOXER® R / RD. Mar. 2014.—Firmenschrift, cited in CA.

* cited by examiner

DEVICE FOR INDICATING A FLUID LEVEL

FIELD OF THE INVENTION

The invention relates to a device for indicating a fluid level. The device has a device housing with a viewing window that provides a view of a transparent indicator body. The indicator body can be at least partially filled with the fluid via at least one port piece. The cavity of the indicator body is reached through by a securing part having a fluid guide and serving to secure the device housing to a third component, such as a fluid storage tank.

BACKGROUND OF THE INVENTION

Devices of this type are known, cf. DE 10 2005 018 897 A1. In technical language, such devices are also referred to as liquid level indicators, wherein the liquid level is indicated visually, for instance by visual observation, or electrically, by generating an electrical signal. This signal can be used as a warning message or for level control. The medium to be displayed or controlled in the form of the fluid passes from the concerning third-party component containing the supply of the fluid, usually a tank, to the indicator body via the port piece. If it is formed in the manner of a riser tube or indicator tube and is transparent, the liquid level can be determined by direct visual observation. Alternatively or additionally, a float can be provided in the riser tube, which float rises or sinks corresponding to the level of the fluid in the third component or tank. If an electrical signal generation is provided, the float actuates a switch contact of an electrical circuit to obtain a desired indication and/or to perform a control function.

Fluids to be indicated and/or controlled by such devices are, in particular, pressure fluids, such as mineral oil according to DIN 51524, Parts 1 and 2, water-oil emulsions and synthetic fluids, such as phosphate-ester-based hydraulic fluids. In the case of pressure fluids or hydraulic fluids located in a third component, such as a tank. The devices are suitable for direct attachment to the third component or the tank. In this case, it is state of the art to secure the port piece of the device to the opening of the wall of the third component by screwing it in place using the securing part. For the operational safety of these devices, it is important that the fluid path leading from the inside of the third component to the inside of the indicator body via the port piece is perfectly and permanently sealed at several sealing areas. To meet these requirements, it is state of the art to maintain very tight tolerances in the manufacture of the port pieces, in particular with regard to the geometry of the sealing surfaces, resulting in correspondingly high manufacturing costs.

SUMMARY OF THE INVENTION

Based on this state of the art, the invention addresses the problem of providing a device of the type mentioned above, which is characterized by a high degree of operational reliability even though it can be manufactured rationally and inexpensively.

According to the invention, this problem is basically solved by a device having, as an essential feature of the invention, a port piece including a support structure with individual ribs interconnecting plate-shaped wall parts of the port piece and with the support structure encompassing the cavity. Because, in contrast to the state of the art, the port piece is not a solid body but a structure formed from individual ribs. On the one hand, the reduced material quantities required result in lower costs. On the other hand, the ribbed structure avoids the large differences in wall thickness, inherent in a solid body, in the various areas of the port piece. In case of the thermal loads to which the port piece is subjected in operation due to temperature differences of the fluid, because of the identical wall thicknesses also distortion is minimized, so that the geometry of the sealing areas is not affected, which ensures permanent operational reliability. Even during manufacture, for instance in an injection molding process, the ribbed structure permits an extensive dimensional stability, and there are virtually uniform shrinkage processes when the port piece cools down. In contrast to components having a block-shaped material accumulation, there are no sink marks.

In advantageous exemplary embodiments, the cavity for the passage of the securing part has a cylindrical passage section, into which a supply section for the indicator body opens in a fluid-conveying manner, which can be placed on an annular mount that at least partially encloses the supply section.

Advantageously, the arrangement may be such that the annular mount is shaped in the manner of an ellipsoid and forms the seat for a sealing ring that seals the interior of the indicator body from the environment. The indicator body is seated on the one wall part, adjacent to the indicator body, of the port piece. Because the indicator body, matching the elliptical shape of the annular body, forms a kind of flat tube, the viewing window can have a larger width compared to the housing depth of the device, providing a sufficient width of the viewing window despite the compact design of the device. Simultaneously, the one wall part of the rib structure forms a bearing surface supporting the indicator body. Because on the annular structure of the ellipsoid a seat for the sealing ring is formed, in which the sealing ring is held against falling off before assembly, the assembly process of fitting the indicator body is also facilitated and safer. To secure the position of the sealing ring, the seat can advantageously be formed by a flat-bottomed annular groove formed in the annular mount.

In advantageous exemplary embodiments, the ribs are longitudinal and transverse ribs. The longitudinal ribs extend in parallel to the longitudinal axis of the indicator body and connect the one wall part to a further wall part, which co-delimits the port piece to the outside. The transverse ribs are arranged in pairs opposite from each other and are reached through by an assigned longitudinal rib each, which longitudinal rib extends in parallel to the longitudinal axis of the passage section. As a result, the outer rims of the ribs delineate the outline of a cuboid block having rounded corner areas. The block in the same way as a port piece, designed as a solid body, forms the contact surfaces, adapted to the housing shape, for the device housing in a stable manner.

Advantageously, the passage section has on its end, facing the device housing, an annular mount for the flush mounting of an annular seal. Preferably, a flat contact surface is also provided on this annular mount instead of a sealing surface formed by a slope. When the annular seal is flush-mounted, the device housing is in full-faced contact with the port piece.

Advantageously, the rim of the passage section forms a projecting annular elevation on its side facing the third component to increase the sealing effect. In an advantageous manner, the ring-shaped or circular elevation is arranged centrally on the planar rim.

As a component that can be manufactured particularly efficiently and cost-effectively, the port piece, conceived as an injection-molded part, can preferably be formed of a plastic material, such as PA6, which is particularly preferably glass-fiber-reinforced. Advantageously, an adequate glass fiber content can be provided for this purpose.

In particularly advantageous exemplary embodiments, the device housing, viewed in cross-section, is a U-shaped profile piece, wherein the port piece closes off an associated free end of the device housing like a plug.

Advantageously, the arrangement can be made in such a way that the second wall part of the port piece protrudes beyond the end of the profile piece and has a corrugated section at its free end. Advantageously, the projecting end can reach over the U-shaped end rim of the profile piece in a flush manner, and thus, forms a haptically and visually advantageous cover of the end edge of the profile piece. The corrugated section contributes to stabilizing the port piece.

Furthermore, it is advantageous to arrange a port piece each at the opposite ends of the profile piece, wherein the two annular seals, one for the screw connection section and one for the passage section of the port piece, are formed identical. To avoid the risk of a mix-up, the use of identical seals, preferably in the form of O-rings, contributes to a simple and safe assembly.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
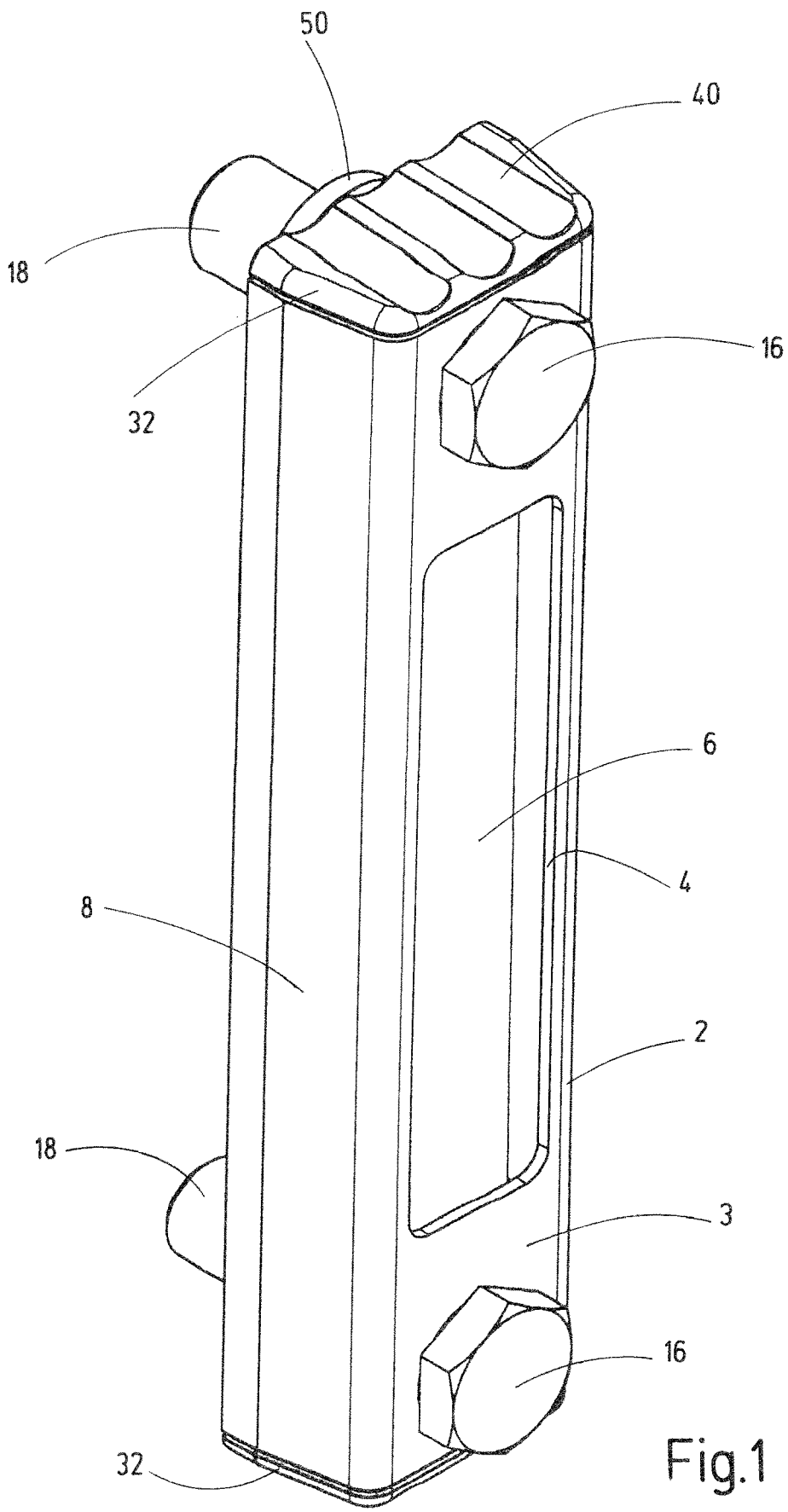
FIG. 1 is a perspective view of a fluid level indicator according to an exemplary embodiment of the invention.
Figure 2:
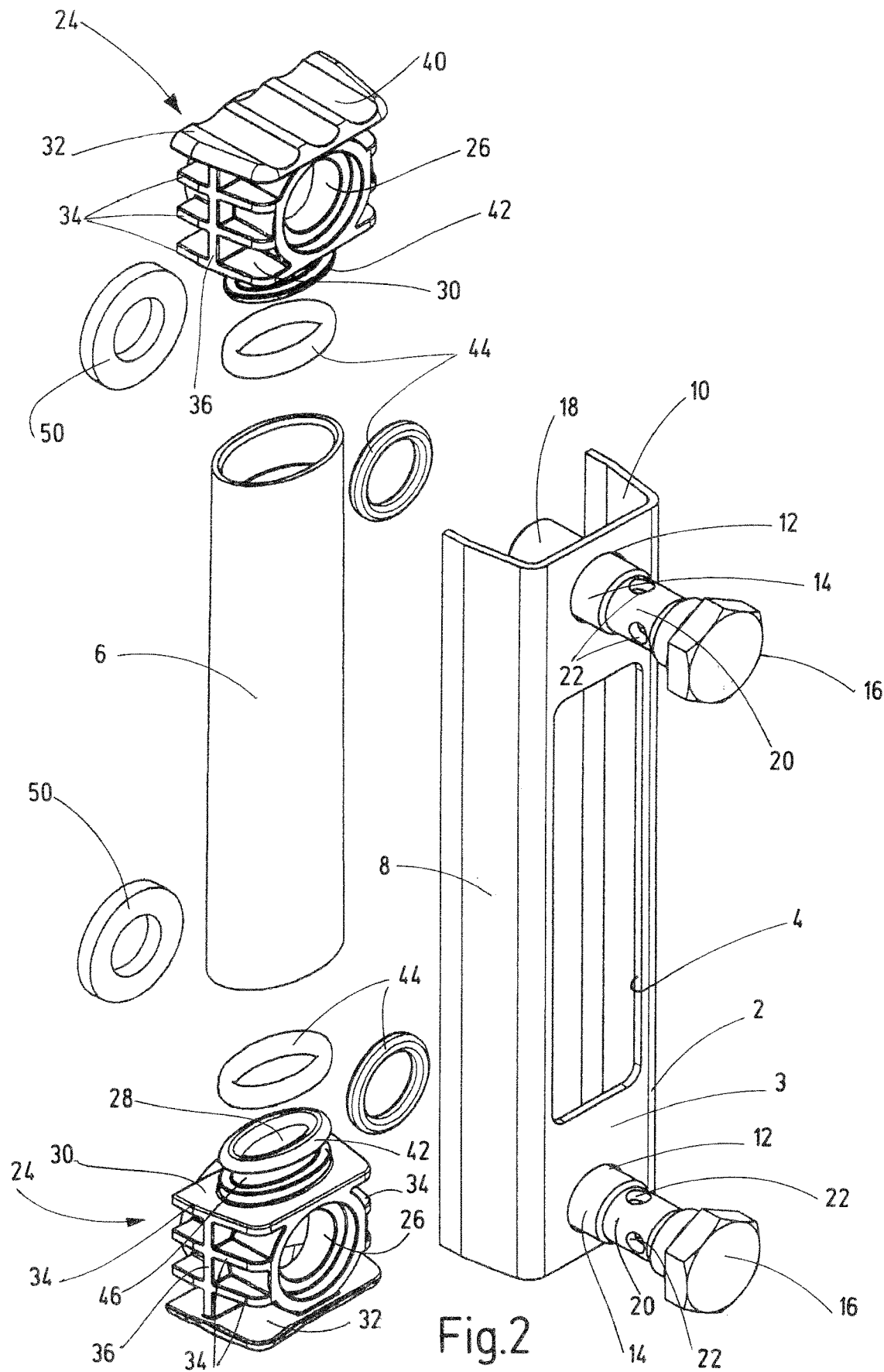
FIG. 2 is a perspective view of the individual parts, pulled apart in the manner of an exploded drawing, of the exemplary embodiment.

The exemplary embodiment, shown in the drawing, has a device housing 2, which in its front end 3 has a cutout, which forms a viewing window 4, which exposes a view on an indicator body 6. The indicator body 6 is a riser tube made of a transparent plastic material that permits the direct visual observation of the fluid level of a fluid contained in the indicator body 6. The device housing 2 is formed of a profile piece made of aluminum, steel or stainless steel, and has a U-shaped cross-section with lateral profile legs 8 and 10. Legs 8 and 10 laterally adjoin to the profile bar, forming the front side 3, and laterally surround the indicator body 6. Near the upper end of the profile and near the lower end of the profile a drilled hole 12 is formed each, which each are centrally in the front side 3 and provided for a banjo bolt 14 to pass therethrough. The viewing window 4, formed by an elongated cutout in the front side 3, terminates at equal distances from the upper and the lower drilled holes 12. The banjo bolts 14 at one end of their shaft have a hexagonal head 16 and at the other end they have an outer thread 18 as well as a coaxial internal drilled hole, extending from this end to a shaft part 20, reduced in external diameter and spaced apart from both the head 16 and the outer thread 18. Transverse drilled holes 22 are formed in this shaft part 20 to provide a fluid connection to the internal drilled hole of the banjo bolt 14.

As in the aforementioned prior art, the fluid connection between the third component, such as a tank (not shown), is established via a port piece 24, which has an internal cavity in the form of a cylindrical passage section 26. To form a fluid connection from the passage section 26 to the riser tube 6 forming the indicator body, in the port 24 a supply section 28 opens into the passage section 26. The fluid connection between the passage section 26 and the third component (tank) is made via the banjo bolt 14, which in the assembled state reaches through the passage section 26, and its end-sided outer thread 18 forms a screw connection (not shown), by which the device housing 2 together with the port 24 and the riser tube 6 is secured to the third component. In this assembly state, the shaft part 20, reduced in diameter, of the banjo bolt 14 is located in the area where the supply section 28 opens into the passage section 26, so that the fluid path to the supply section 28 is formed via the axial drilled hole of the banjo bolt 14 and its transverse drilled holes 22.

Figure 3:
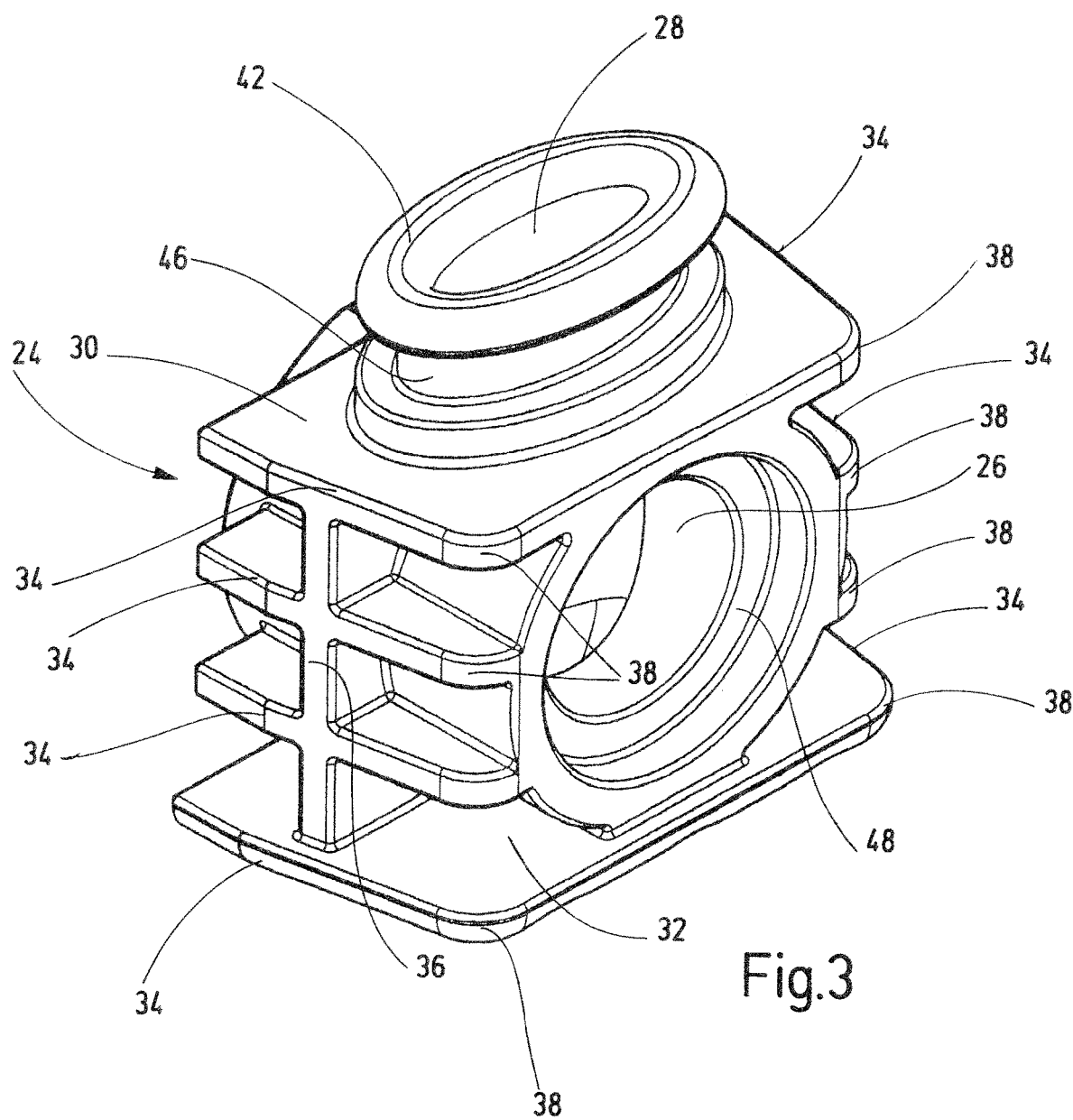
FIG. 3 is a perspective view, magnified compared to FIG. 2, of a port piece of the exemplary embodiment, viewed to the front side facing the device housing.

Unlike in the prior art, the port piece 24 is not a solid body, but has a support structure formed of ribs and wall members connected thereto. In detail, as can be seen most clearly in FIGS. 3 and 4, the support structure has a plate-shaped wall part 30 on the side, facing the riser tube 6, and a plate-shaped wall part 32 on the outside opposite thereto. Having the side rims, facing each other in pairs and extending on both sides next to the passage section 26, the wall parts 30 and 32 form transverse ribs 34 interconnected by a centrally located longitudinal rib 36 each, extending in parallel to the longitudinal axis of the supply section 28. The wall parts 30 and 32 form the upper and lower boundary walls, respectively, of the port piece 24. The outer sides and the rounded corner areas 38 of the transverse and longitudinal ribs 34, 36 delineate the shape of a block, which as a shaped body is adapted to the inside of the profile piece, forming the device housing 2, so that in the assembled state the ribs 34, 36 form contact surfaces for the housing 2. The outline of the wall part 32, forming the outside, is slightly larger than the outline of the inner wall part 30 and of the ribs 34, located between the wall parts 30 and 32, so that in the assembled state shown in FIG. 1, the port piece 24 forms a plug-shaped closure of the housing 2, wherein the wall part 32 reaches over the free end rim of the housing 2. As also most clearly shown in FIG. 1, the outer surface of the wall part 32 has a corrugated section 40.

At the top of the wall part 30, the passage section 26 continues in an annular mount 42, formed by a connector, formed by the wall part 30 and having the shape of an ellipsoid, the axis of which is perpendicular to the axis of the passage section 26. When the riser tube 6 is fitted to the annular mount 42, the seal is formed by an O-ring 44, for which in the annular mount 42 an annular groove 46 is formed, having a flat groove bottom. As can be seen most clearly from FIG. 3, on the end part, facing the device housing 2, of the passage section 26 an annular surface 48 is formed, which forms the mount for an O-ring 44 of the same type as that provided on the annular mount 42.

Figure 4:
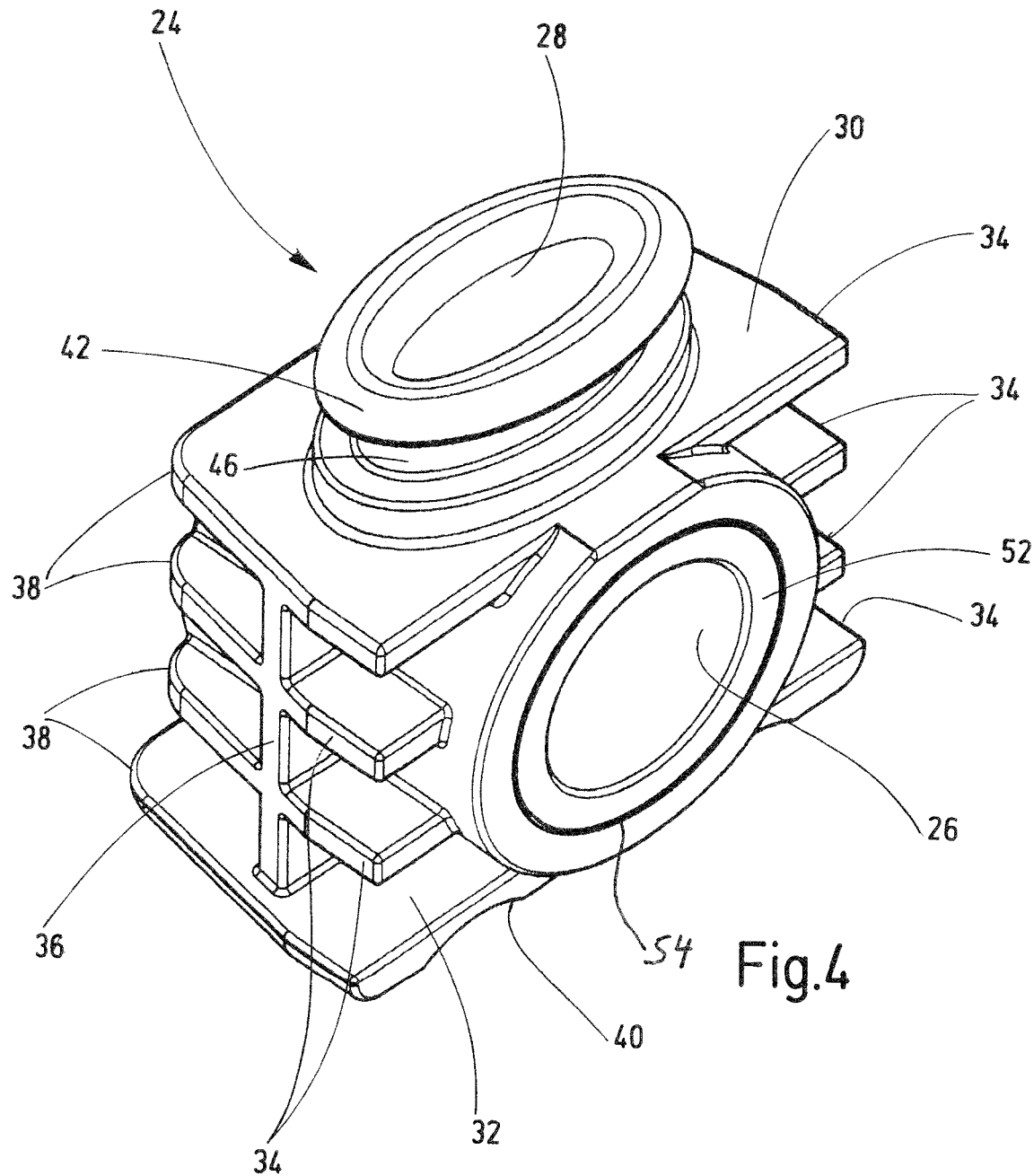
FIG. 4 is a perspective view, corresponding to FIG. 3, of the exemplary embodiment of the port piece, viewed to the rear side facing a third component, such as a tank.

On the opposite side of the port piece 24, which is visible in FIG. 4, on a circular and planar surface 52, which comprises a cylindrical passage surface as part of the passage section 26, preferably a circumferential projection 54 is provided centrally, which projects outwards and, when in contact with a third component, such as a tank, results in an increased sealing force effect in the concerning contact area. In this respect, the annular surface 52 forms a flat seal with the third component. Furthermore, the elevation 54 is triangular in shape, viewed in cross-section. As per usual, at both ends of the device housing 2, the mechanical and fluidic connection to the third component is formed via another port piece 24 and other identical parts. The respective port piece 24 is preferably manufactured as an injection-molded part from a glass-fiber-reinforced plastic material, such as PA6, wherein advantageously a predeterminable glass-fiber content is provided.

While one embodiment has been chosen to illustrate the invention, it will be understood by those skilled in the art that various changes and modifications can be made therein without departing from the scope of the invention as defined in the claims.

The invention claimed is:

1. A device for indicating a fluid level, comprising:
   a device housing having a viewing window and having opposite first and second longitudinal ends;
   a transparent indicator body being capable of being at least partially filled with the fluid in a body interior of the indicator body and being mounted in the device housing to be viewable through the viewing window;
   a first port piece being located at the first longitudinal end of the device housing, having a cavity forming a passage section connected in fluid communication with the body interior, being a support structure with individual ribs interconnecting plate-shaped wall parts of the first port piece, and encompassing the passage section; and
   a securing part being capable of securing the device housing and the first port piece to a third component containing a fluid and having a fluid passageway connected in fluid communication with the passage section in the first port piece.

2. The device according to claim 1 wherein
   the individual ribs include longitudinal ribs and transverse ribs, each of the longitudinal ribs extending parallel to a longitudinal axis of the indicator body and being connected to each of the one wall parts co-delimiting the first port piece to an outside thereof; and
   the transverse ribs are arranged in pairs on opposite sides of the first port piece with each of the pairs being connected to a respective one of longitudinal ribs and extending parallel to a longitudinal axis of the passage section.

3. The device according to claim 1 wherein
   an annular mount is on an end of the first port piece facing the device housing, the annular mount having an annular seal mounted flush thereon.

4. The device according to claim 1 wherein
   a second port piece is identical to the first port piece and is arranged at the second longitudinal end of the device housing; and
   first and second annular seals are provided at a supply section of the indicator body in fluid communication therewith and at the passage section, respectively, of each of the first and second port pieces.

5. The device according to claim 1 wherein
   the passage section is cylindrical and opens into a supply section of the indicator body in fluid communication therewith, the indicator body being mounted on an annular mount of the first port piece that at least partially encloses the supply section.

6. The device according to claim 5 wherein
   the annular mount has an ellipsoid shape and forms a seat receiving a sealing ring sealing the body interior of the indicator body from an environment surrounding the indicator body, the indicator body being seated on the wall part adjacent to the indicator body of the first port piece.

7. The device according to claim 1 wherein
   the passage section includes a projecting annular contact surface contacting an annular seal on a side of the passage section facing the third component.

8. The device according to claim 7 wherein
   a circular protrusion is an integral part of the annular surface, encompasses the passage section, and increases the sealing effect of the annular seal, the annular seal being flat seal.

9. The device according to claim 1 wherein
   the device housing has a U-shaped profile in cross-section; and
   the first port piece closes an assigned free end of the device housing in a plug manner.

10. The device according to claim 9 wherein
    one of the wall parts protrudes beyond the assigned end of the device housing and has a corrugated section at an exposed free end thereof.

11. The device according to claim 1 wherein the first port piece is an injection-molded part.

12. The device according to claim 11 wherein the injection-molded part is formed of plastic material.

13. The device according to claim 11 wherein the plastic material is PA6.

14. The device according to claim 13 wherein the plastic material is glass-fiber-reinforced.

* * * * *